W. VARAH.
Knob-Latches.

No. 148,785. Patented March 17, 1874.

Witnesses:
A. Bennerkendorf.
C. Sedgwick.

Inventor:
W. Varah
Per Munn & Co
Attorneys.

UNITED STATES PATENT OFFICE.

WALTER VARAH, OF NEW HAVEN, CONNECTICUT.

IMPROVEMENT IN KNOB-LATCHES.

Specification forming part of Letters Patent No. 148,785, dated March 17, 1874; application filed May 17, 1873.

*To all whom it may concern:*

Be it known that I, WALTER VARAH, of the city and county of New Haven and State of Connecticut, have invented a new and useful Improvement in Knob-Latches; and I do hereby declare that the following is a full, clear, and exact description of the same, reference being had to the accompanying drawing forming a part of this specification.

This invention relates to novel means for shifting a sliding sleeve on a knob-spindle, as hereinafter fully described.

Figure 1:
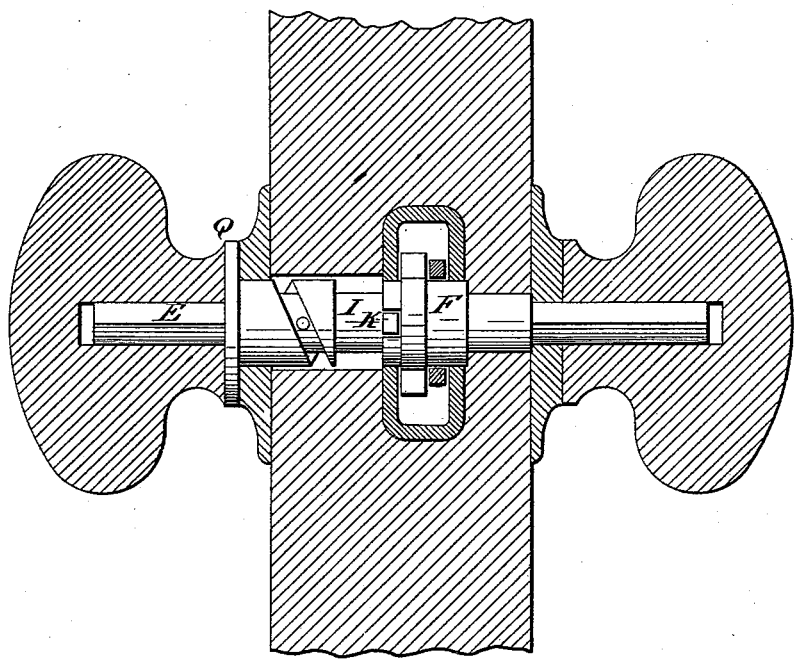
Figure 2:
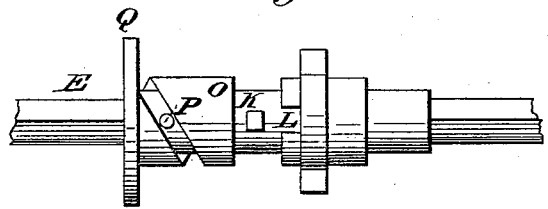

Figs. 1 and 2 are side elevations of a knob-spindle provided with my improved means for shifting a sliding sleeve arranged thereon.

E is the spindle of knob, and F the loose hub that actuates the bolt and having the notch L. I is the sliding sleeve fitted to spindle, and having the stud K and pin P, and O the revolving sleeve having spiral slot and milled head Q.

The operation is as follows: The milled head Q being turned, the sleeve O (by its spiral slot, in which is the pin P,) moves the sleeve I inwardly or outwardly, thus throwing the stud K into or out of the notch L of hub. Thus the spindle may be connected with or disconnected from the hub F that operates the bolt.

Having thus described my invention, what I claim is—

The combination, with knob-spindle E and loose notched hub F, of the sleeve I, having stud K and pin P, and the spirally-grooved sleeve O, having head Q, as and for the purpose described.

WALTER VARAH.

Witnesses:
FRANCIS MOTHEY,
P. E. WHALEN.